United States Patent

[11] 3,584,647

[72] Inventor Robert E. Brown
 31707 Middleboro, Livonia, Mich. 48150
[21] Appl. No. 846,562
[22] Filed July 31, 1969
[45] Patented June 15, 1971

[54] SOLENOID PILOT DUMP COMBINATION DIRECTIONAL CONTROL VALVE
 11 Claims, 10 Drawing Figs.
[52] U.S. Cl. ................................................. 137/596.15,
 137/596.16, 137/596.2
[51] Int. Cl. ........................................................ F16k 11/20
[50] Field of Search ............................................ 137/102,
 596, 596.15, 596.16, 596.18, 596.2, 637

[56] References Cited
UNITED STATES PATENTS

| | | | |
|---|---|---|---|
| 3,267,961 | 8/1966 | Rice | 137/102 |
| 3,480,039 | 11/1969 | Brannon et al. | 137/596.2 |
| 2,247,141 | 6/1941 | Twyman | 137/637 X |
| 2,259,439 | 10/1941 | De Ganahl | 137/637 |
| 3,093,008 | 6/1963 | Wight | 74/335 |

Primary Examiner—Henry T. Klinksiek
Attorney—Whittemore, Hulbert & Belknap

ABSTRACT: An oppositely spring loaded spool-type valve is also pilot-pressurized oppositely to control pressure liquid flow past three ball checks and through associated external lines to two hydraulic load actuating cylinders. One of these is a double-acting cylinder selectively pressurized at its opposite ends, and the other is a single-acting, spring return cylinder pressurized at only one end, these cylinders being parts of an external system controlled by the valve. Three two-way solenoid actuated valves are operated under the control of pushbutton switch means to govern the voiding of hydraulic liquid from the respective cylinder ends in certain phases of the operation of the valve; and hydraulic operating pressure is supplied by a motor powered pump. The operation of the pump is also responsive to pushbutton switch operation, whether by itself along or conjointly with the operation of the pressure-dumping solenoid valves, in the said certain phases of operation. The pump pressurizes a valve manifold with which three ball check-governed passages are placed in communication under control of the valve spool.

PATENTED JUN 15 1971

INVENTOR.
ROBERT E. BROWN
BY
ATTORNEYS

INVENTOR.
ROBERT E. BROWN

ATTORNEYS

INVENTOR.
ROBERT E. BROWN
BY
ATTORNEYS

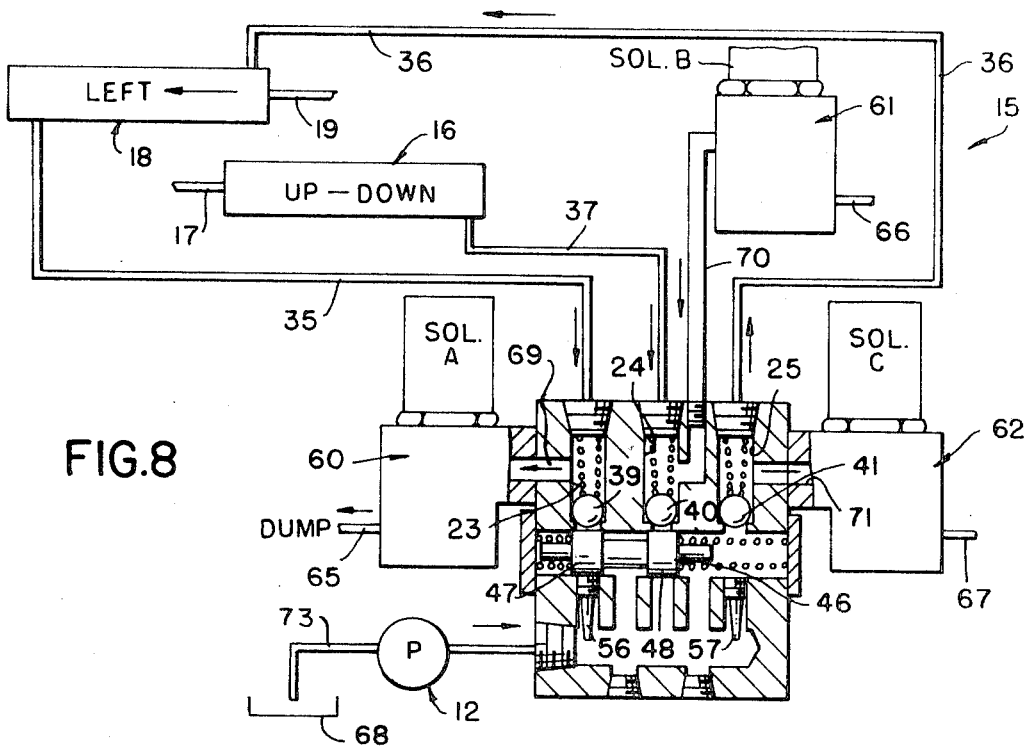
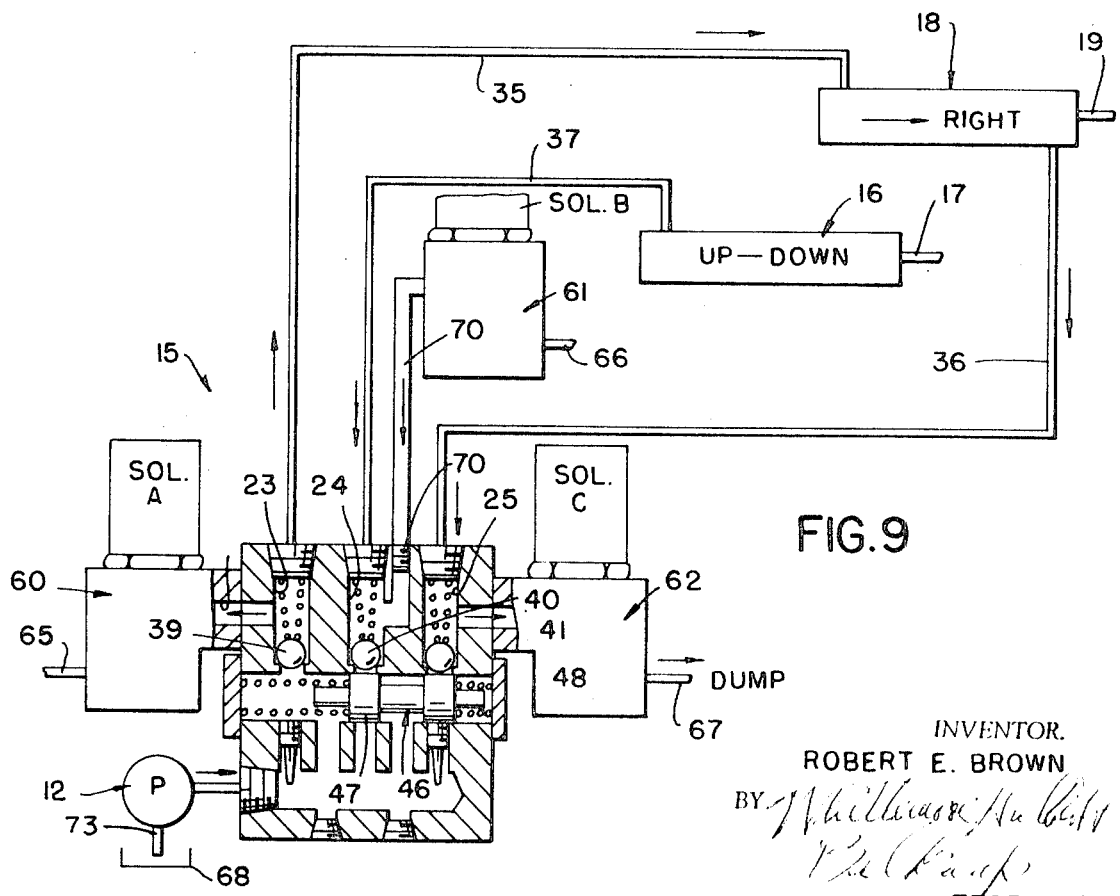

3,584,647

SOLENOID PILOT DUMP COMBINATION DIRECTIONAL CONTROL VALVE

BACKGROUND OF THE INVENTION

1. Field of the Invention

The improved valve of the invention, in effect controls six distinct operational and hold phases, acting in overall effect as a 7-way valve unit. The valve will find wide application in the operation of components of load handling service equipment employed, for example, on industrial or commercial trucks, snow plows or other heavy-duty mobile equipment, also in aircraft, in which it is desired to provide a multiple directional hydraulic control of load handling cylinders, for instance for "up-down" motions as well as "right-left" motions. However, application of the improved valve in systems of a nonmobile nature is of course contemplated.

2. Description of the Prior Art

The most pertinent prior art of which I am aware, based upon a preliminary search, is represented by the following patents:

| | | |
|---|---|---|
| Patton | 2,244,213 | June 3, 1941. |
| Stone | 2,955,608 | October 11, 1960. |
| Horton | 3,180,514 | April 27, 1965. |
| Schenkelberger | 3,354,789 | November 28, 1967. |

The Patton patent discloses a valve structure for controlling plural cylinder means, but it is manually operated mechanically, not through the agency of plural solenoid valve means, and utilizes multiple spool valves, rather than a single such valve. Stone shows a solenoid control valve in association with a ball check and orifice means, but not in multiple in relation to a single manifold and plural cylinder outlets, as in the herein described valve. Horton and Schenkelberger disclose hydraulic control systems for industrial lift trucks, but the valving arrangements differ widely from those herein shown and described.

SUMMARY OF THE INVENTION

The improved, 7-way hydraulic valve of the invention is illustrated herein as being associated with external solenoid valve components unitarily associated with a valve body having a pressure manifold, internal passaging, spool valve and ball check means to govern the application of hydraulic pressure to a pair of cylinders of the nature mentioned in the Abstract. The valve body has a cylindrical spool chamber in which a control spool is slidably mounted, being equally spring biased at opposite ends thereof, and the spool chamber is adapted to be pilot pressurized differentially at its opposite ends, through restrictive orifices under the control of three solenoid valves; or the spool may be centered neutrally under balanced pilot pressure and a pair of mechanical springs. An appropriate positive displacement pump is driven by an electrical motor to supply pilot and cylinder operating pressure to the spool drive component; and in four distinct operating phases, out of a total of six overall operating and hold phases in the operation of the system, a. the pump is (a) operated alone with all three solenoid controlled valves deenergized and closed, whereby to fully prime and pressurize all of the internal and external passages and lines of the system, including both ends of a double-acting load cylinder to balance or neutralize the latter and one end of a spring-biased, single-acting load cylinder to drive the latter for an "up" phase;

b. the pump is inoperative and only one solenoid is energized and opened, thus enabling the single-acting cylinder to depressurize and return in a "down" phase;

c. the pump is operated with a second of the three solenoid valves energized and opened, for an actuation of the double-acting load cylinder in one direction in a third phase, for example in a "left" phase; and d. the pump is operated with only the third of the three solenoid-actuated valves energized and opened, for a reverse actuation of the double-acting cylinder in the opposite direction in a fourth phase, for instance a "right" phase.

As indicated above, in phase (a) all external liquid pressure lines or conduits of the system are fully pressurized, coupled with a balanced spring and pilot pressurization of the valve spool in a neutral position, an opposite and equal pressurization of opposite ends of the double-acting load cylinder to neutralize the latter also, and an "up" pressurization of the single-acting load cylinder. In phase (b) of the operation of the valve and system, an opened solenoid valve voids hydraulic pressure from the single-acting cylinder, the latter's spring performing the "down" stroke. In phase (c) one end of the double-acting cylinder is depressurized by opening of a second solenoid valve to void one end of the double-acting cylinder for a directional stroke in, for example, a "left" phase. In phase (d) the third solenoid valve voids the opposite end of the double-acting cylinder for a "right" stroke. Structurally speaking, the pump unit and its provisions for hooking up with external cylinder means and conduitry are extremely simple, reliable and foolproof. Likewise, the unit, notwithstanding the fact of its multiple, 7-way character, is extremely compact in size, and of low cost as to its production, assembly, and certain standard conventional components thereof.

BRIEF DESCRIPTION OF THE DRAWINGS

FIG. 8 is another similar view, but depicting the valve components in a third position for a cylinder "left" phase, for example, in which a second solenoid valve only is energized and the pump is in operation;

FIG. 9 is yet another schematic layout similar to FIGS. 6—8, but with only a third solenoid valve energized and open and the pump running, for a cylinder "right" phase of operation.

Figure 1:
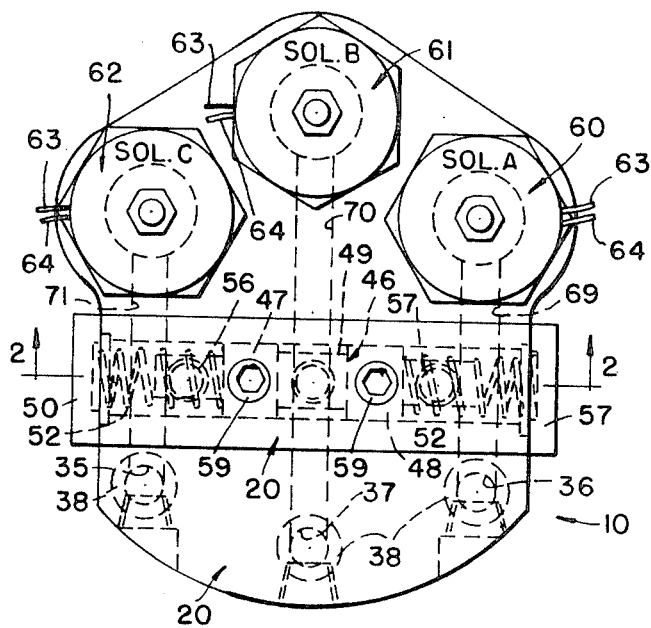
FIG. 1 is a top plan view of the improved valve of the invention.

Reference being had to the schematic showings of FIGS. 6—10, inclusive, the improved solenoid valve-controlled and hydraulically directional control valve of the invention, generally designated by the reference numeral 10, receives hydraulic liquid from a suitable pump 12, preferably a positive displacement gear type driven by an appropriately rated electrical motor 14; the valve and pump are parts of a system 15 to control the distribution of the hydraulic pressure fluid selectively, in a typical installation, to two hydraulic load actuating or control cylinders which are also parts of the system. One of these is a single-acting spring returned cylinder 16 whose plunger 17 may be connected to power a load component of heavy-duty mobile equipment to control an "up-down" actuation of that component, for example, a lift fork or plow. The other cylinder 18 is typically a double-acting one, whose plunger 19 may control, for example, the "right-left" directional action of a movable working or load component. The cylinders are supplied with, and exhausted of, pressure fluid by internal valve passage and external conduit or line components of the system 15, in a manner to be described.

Reference now being had to FIGS. 1—5, the valve 10 of the invention comprises a generally rectangular, blocklike valve body 20 including an integral and medial top extension 20', which body and extension are internally cored and/or bored to afford a cylindrical pressure manifold space 21; a central valve spool space or chamber 22, also cylindrical and paralleling manifold 21 in the same plane as the latter; three identical, cylindrical ball check chambers 23, 24 and 25 equidistantly spaced from one another, these chambers being coplanar with and opening at 90° to spool chamber 22 through lesser diameter ball check ports or seats 26, and being closed at the bottoms thereof by pipe plugs 23', 24' and 25'; three coplanar spool-controlled passages 27, 28 and 29 in communication between the manifold and spool chambers 21, 22, respectively; and a pair of orifice plug receiving passages 30, 31, one on either side of the set of passages 27—29.

Figure 5:
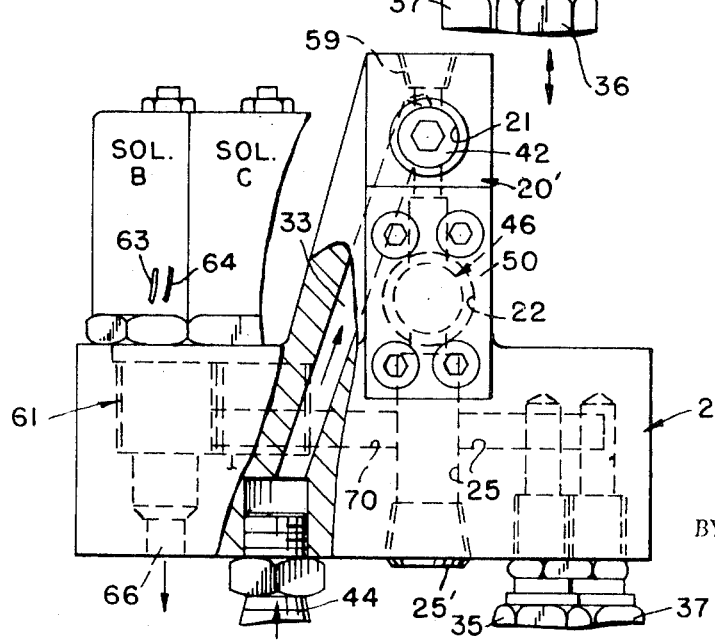
FIG. 5 is an end view of the valve from the right of FIG. 2, being partially broken away and sectional to show an internal pump pressure-to-manifold passage of the valve.

The valve body 20 is also drilled, as best shown in FIG. 5 to provide a slanted pump pressure passage 33 which communicates upwardly through a port 34 (FIG. 2) with manifold 21 to pressurize the latter. Passage 33 communicates at its bottom with a pressure port swivel fitting, to be described.

The two side ball check chambers 23 and 25 connect through hydraulic lines or conduits 35, 36, respectively, with opposite ends of the double-acting "right-left" hydraulic cylinder 18; while the intermediate similar chamber 24 is placed in communication by a third pressure line or conduit 37 with an end of the other, single-acting or "up-down" cylinder 17. Connections of the lines 35—37 with the ball check passages are made through appropriate plug fittings 38, which may be Flodar #RBA-1000-4 type, one-fourth inch o.d. tube fittings. Ball checks 39, 40 and 41 in the respective passages 23, 24 and 25 are urged by coil springs 41' to normally close the intake ports 26 from spool chamber 22 to those passages.

Figure 10:
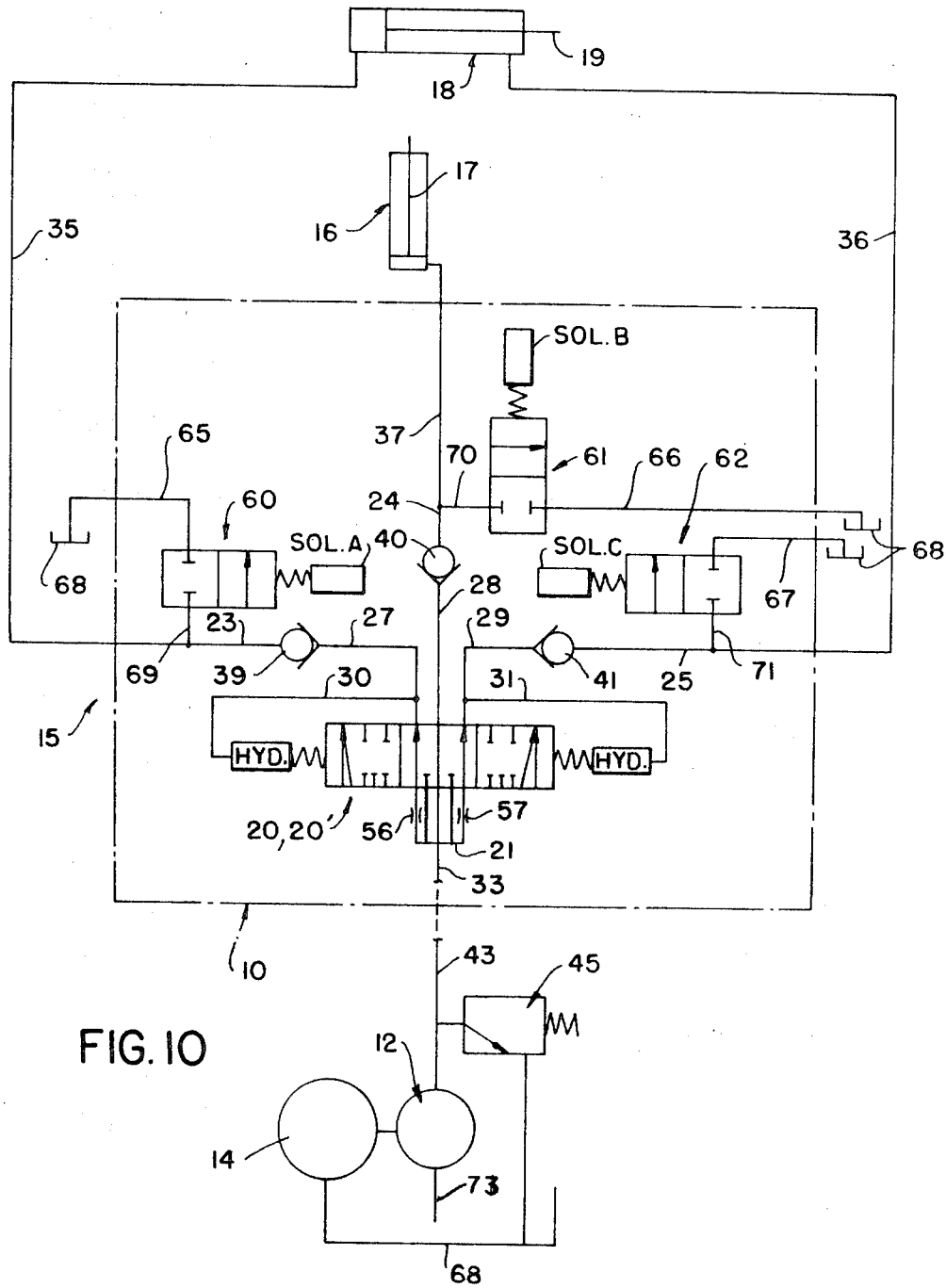
FIG. 10 is a schematic view of the system of FIGS. 6—9; employing conventional A.S.A. symbols to indicate hydraulic flow paths through various valve components and conduitry between the motor-driven pump and the load cylinders.

The manifold chamber 21 is closed at one end by an appropriate pipe plug 42; and manifold 21 is pressurized, when pump 12 is in operation, through the valve's pressure passage 33. The latter is itself pressurized from a pump discharge line or conduit 43 connecting to a pressure port of valve body 20 through the agency of a one-fourth inch NPSM female swivel coupling 44. Line 43 is equipped with a conventional relief valve 45 (FIG. 10).

Figure 2:
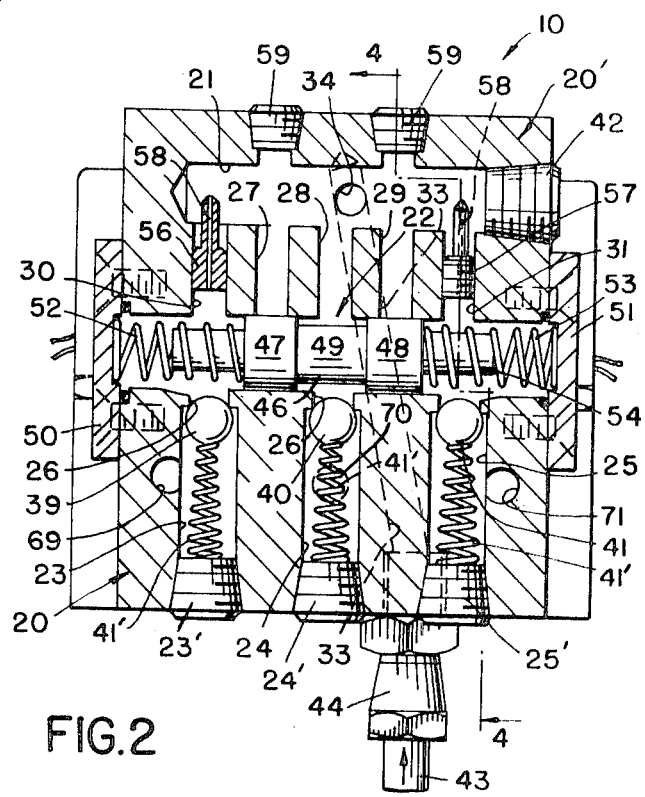
FIG. 2 is a view in vertical section on line 2-2 of FIG. 1.
Figure 3:
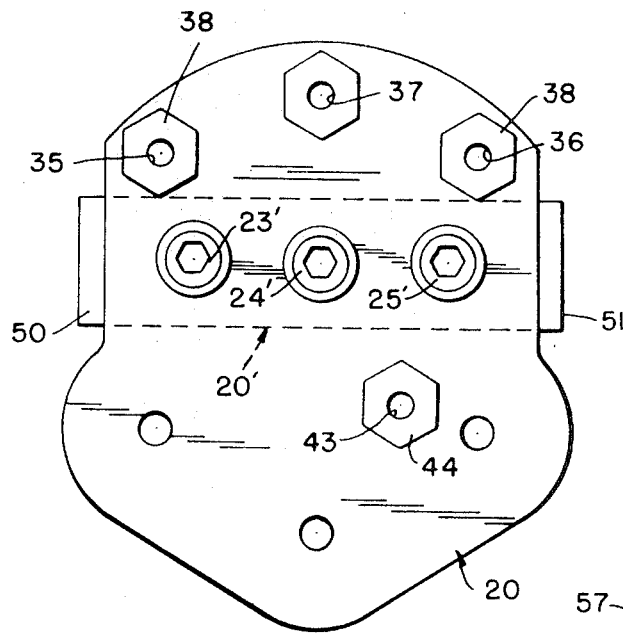
FIG. 3 is a bottom plan view of the valve.
Figure 6:
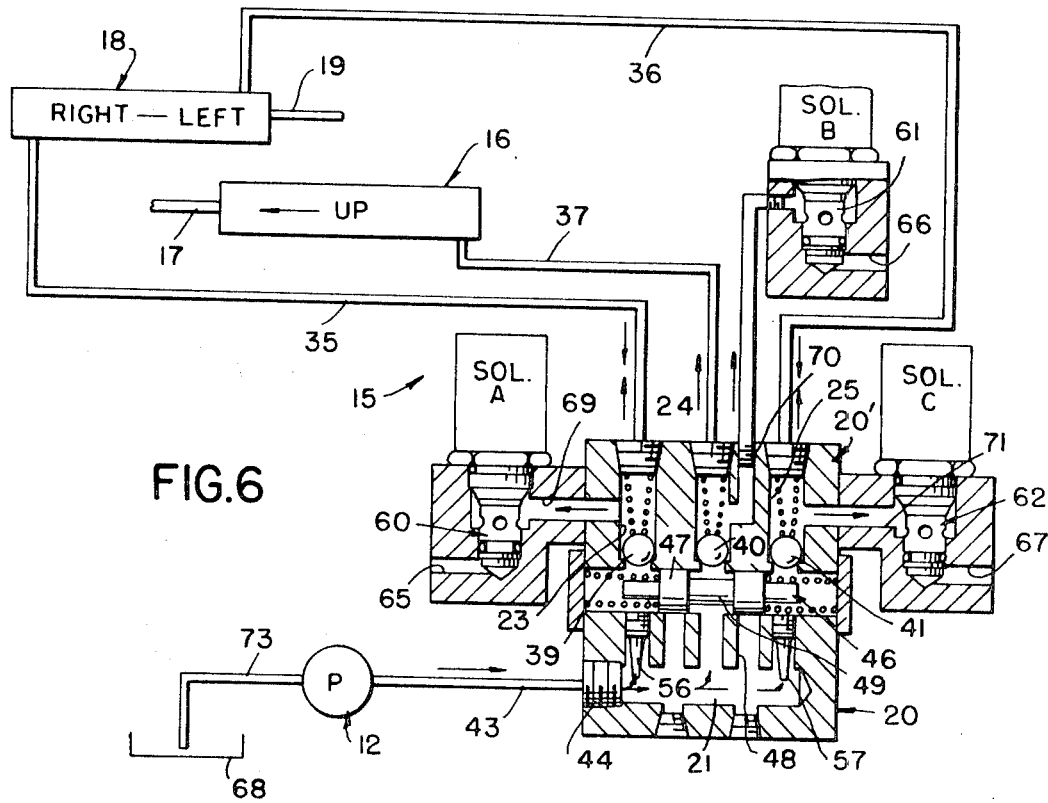
FIG. 6 is a schematic layout, partially sectioned, of the improved valve as assembled in a typical pump and power cylinder application, valve components being shown in a neutral position, as for a first, cylinder "up" phase of operation, in which none of the three solenoid operated valves of the valve unit is open, the pump of the system being in operation.
Figure 7:
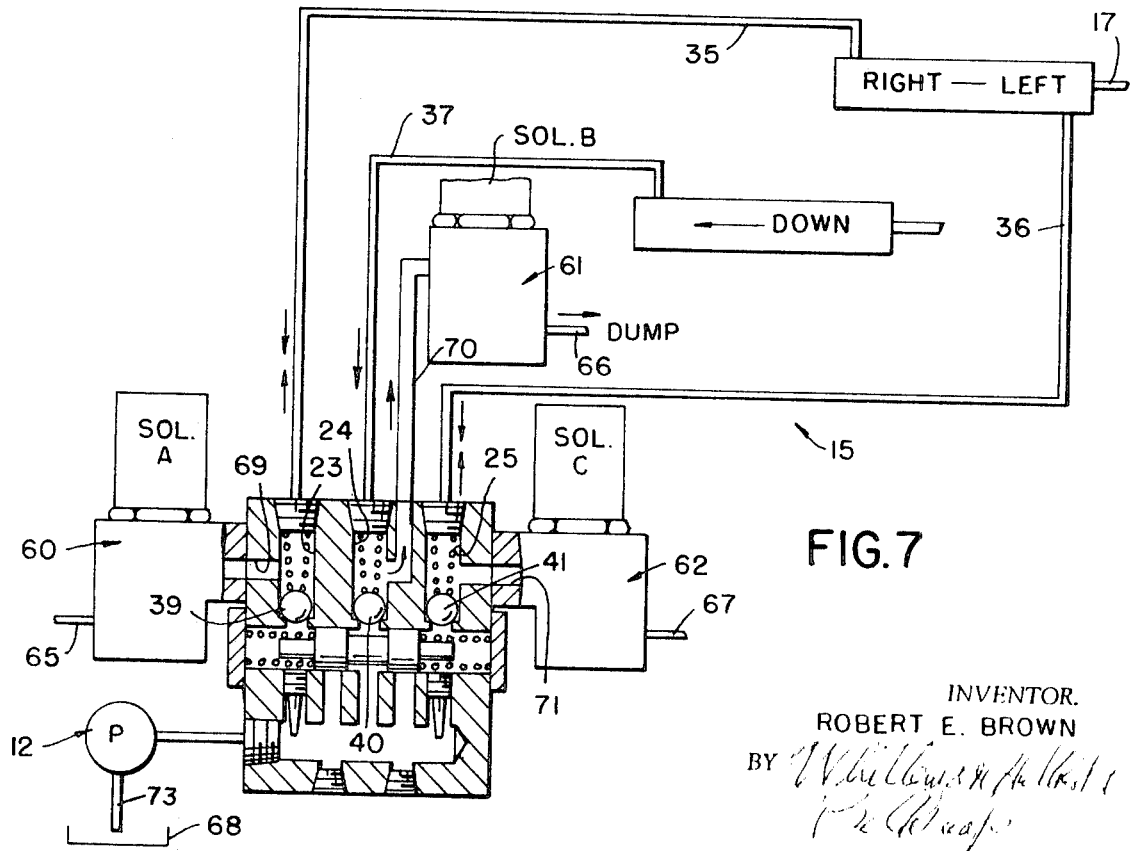
FIG. 7 is a schematic layout similar to FIG. 6, also showing the valve spool in the neutral position, but with one of the solenoid operated valves energized and open and the pump operation for a cylinder "down" phase.

The spool chamber 22 slidably receives a control spool 46 which has a pair of enlarged diameter control lands 47, 48 spaced from one another by an intermediate, lesser diameter spool relief portion 49. Manifold 22 is closed at its opposite ends by O-ring sealed end plates 50, 51 screw-connected securely to the ends of valve body 20 and its extension 20'; and a pair of spool-centering coil springs 52, 53 bottom against these plates. The springs pilot inwardly upon reduced-size extensions 54 of control spool 46, axially abutting the respective lands 47, 48 of the latter; and the springs normally act with equal force oppositely upon the spool to center the same in a neutral position, such as is shown in FIGS. 2, 6 and 7. In this position only the central ball check chamber is in full communication with pressure manifold 21.

As appears best in FIG. 2, each of the outer valve body chambers 30 and 31 threadedly receives a pilot orifice plug, the respective plugs being designated 56 and 57. Each has, typically, a 0.038 inch orifice bore 58 exposed at the smaller end of the plug to the pressure manifold 21 of valve body 20, 20'. Threaded pipe plugs 59 close holes in body 20 necessary for the formation of the passages 27, 29, the latter being offset in relation to the functional ball check chambers 23, 24 and 25.

Figure 4:
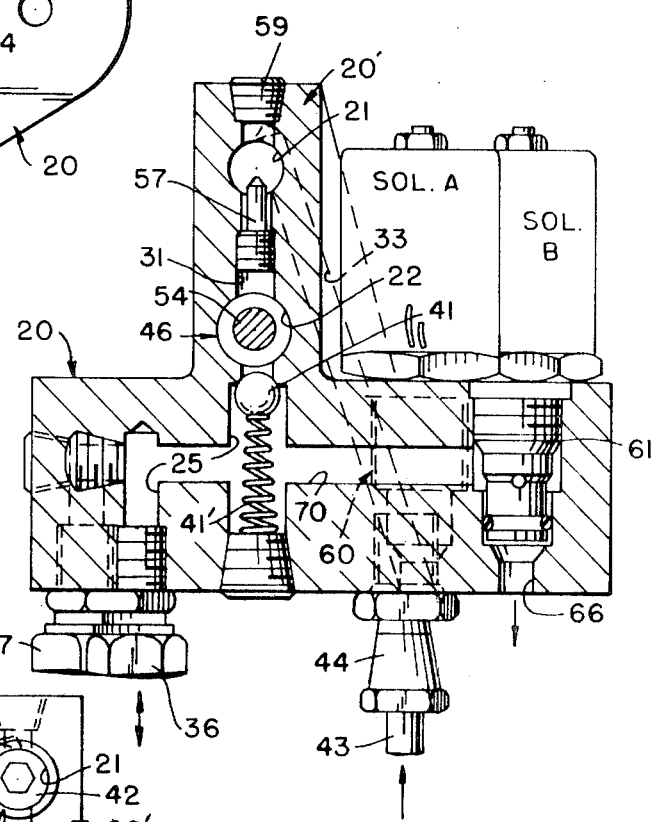
FIG. 4 is a view in transverse vertical section on broken line 4-4 of FIG. 2.

As structurally shown in FIGS. 1, 4 and 5, and schematically in FIGS. 6—10, inclusive, the improved valve 10 has fixedly mounted thereon, as atop its body block 20, three normally closed, two-way cartridge type, solenoid-controlled valves 60, 61 and 62, the operators of which are designated "Sol. A," "Sol. B" and "Sol. C," respectively. These may typically be the product of Fluid Power Systems Division of Ambac Industries, Inc. of Wheeling, Illinois, model designation No. 103-XX, but any other type having equivalent operational characteristics may be employed. The solenoid windings of these valves are energized by leads 63, 64, through the agency of four appropriate manual pushbutton switches (not shown) connected to an appropriate electrical power source, such as the battery of a vehicle upon which the system 15 is installed. The operative effects of manipulations of such switches will hereinafter be described.

As schematically depicted in FIGS. 6—10, the solenoid valves 60, 61 and 62 are adapted to dump through the respective passage and conduit means 65, 66 and 67 to tank or sumplike receiver means, which may in actuality be, and is represented as, the tank or sump 68 from which the intake of pump 12 draws. Branch pressure passage or conduit means to the several solenoid valve components 60, 61 and 62 are numbered 69, 70 and 71, respectively, in FIGS. 6 through 10. They connect with the respective ball check chambers 23, 24, 25 and cylinder pressure lines 35, 36, 37. Other passage components external of the valve 10 of the invention bear reference numerals corresponding to those employed in FIGS. 2, 4 and 5 dealing with structural features of the valve.

The operation of the valve 10 as incorporated in the system 15 schematically depicted in FIGS. 6—10, inclusive, involves six distinct phases in which the improved valve in effect serves as a 7-way spool and solenoid control unit. These conditions or positions are numbered and briefly identified as follows:

1. Cylinder 16 "up" L only pump 12 operating to pressurize cylinder (FIG. 6);
2. Cylinder 16 "down": pump not operating—solenoid B energized and valve 61 open to dump the cylinder for spring return (FIG. 7.);
3. Hold: cylinder 16 checked by ball check 40 at any time after position 1 or 2 to preserve an "up-down" setting;
4. Cylinder 18 "left" : solenoid A energized, valve 60 open to dump cylinder left end, and pump operating at same time (FIG. 8);
5. Cylinder 18 "right": solenoid C energized, valve 62 open to dump cylinder right end, and pump operating at same time (FIG. 9);
6. Hold: cylinder 18 checked at any time after position 4 or 5 by ball checks 39, 41 to preserve a "left-right" setting.

These operations are governed and timed manually at a master switch panel presenting four pushbuttons (not shown), to put in effect for operational phases, cylinder 16 "up" or "down" and cylinder 18 "left" or "right." The switches are electrically connected, upon depression of the four respective buttons, between an electrical battery or like source and the pump operating motor 14 only, between the source and the solenoid B only, simultaneously between the source and solenoid A and pump motor only, and between solenoid C and motor 14 only. The cylinder "hold" conditions are set up automatically by spring-biased closure of the three ball checks 39, 40 and 41, concurrently with a release of the pushbutton in question.

FIG. 6, in which single and double-headed arrows show flow directions, schematically depicts the condition of valve 10, and the operation of associated valve means for cylinder 16 "up" position 1. With only pump 12 driven upon depression of the "up" pushbutton, liquid is drawn from the supply tank or sump 68, passing through a vacuum intake line 73 to pump 12, thence through the conduit 43 to pressurize manifold space 21. All three solenoid control valves 60, 61 and 62 are closed in this cylinder "up" phase. Pressure is transmitted through orifices 56, 57 and lines 30, 31, respectively, to the opposite ends of spool valve chamber 22. These pressures cancelling out, so that valve spool 46 remains centered, centering springs 52 and 53 also cancelling out. Similarly, the opposite ends of the double-acting "right"-"left" cylinder 18 are equally pressurized effectively through the respective orifices 56, 57 ball check chambers 23, 25 and lines 35, 36 with the result that the plunger 19 remains in a neutral position.

The sole positive effect is that the full pump output pressure is applied through valve passage 28, annular spool valve space 49, center ball check chamber 24 and line 37 to the bottom of the "up"-"down" cylinder 16 to raise its plunger 17. Since solenoid A, solenoid B and solenoid C are deenergized and their respective valves 60, 61 and 62 are closed, upon conclusion any part of the "up" operation of cylinder 16, and release of the depressed "up" pushbutton, the pressure in line 37 to cylinder 16 remains locked in that portion of the system 15, the ball check 40 going to its closed position. This represents a "hold" of "up" condition 1.

When it is desired to depressurize cylinder 16 and lower its plunger 17 under spring action for the cylinder "down" condition 2, the "down" pushbutton is depressed. This simultaneously cuts off motor operation of pump 12 and energizes solenoid B (FIG. 7), with the effect of opening valve 61 and voiding hydraulic liquid from the bottom of cylinder 16 and lines 37, 70 and 66 to the tank or sump 68, whereupon the plunger of cylinder 16 is spring returned downwardly to its original position. In position number 2, prepressurized hydraulic liquid in double-acting cylinder lines 35 and 36 is locked by ball checks 39, 41 in the external system, the lines 37, 70 and 66 exhausting liquid from cylinder 16, as just described. At any point the spring "down" action of cylinder 16 may be interrupted by releasing the "down" pushbutton, this representing a second selective "hold" of the action of cylinder 16.

In the condition or position 4 to operate cylinder 18 to the left, as depicted in FIG. 8, the switch "left" pushbutton is depressed, with the effect of simultaneously motor-driving the pump 12 and energizing solenoid A to open valve 60. This voids prepressure from the left end of "right-left" cylinder 18 through external conduit 35, ball check chamber 23 and passage 69 to the exhaust line 65 of solenoid valve 60. Ball check 39 seats. The consequent blockage of left-hand orifice plug 56 causes pilot pressure through the other orifice plug 57 to dominate in the right-hand end of spool chamber 22, thrusting spool 46 to the left, compressing its spring 52 and causing its lands 47, 48 to seal off the seats 26 for ball checks 39 and 40. The corresponding seat for ball check 41 is opened, and the flow of pressure is through line 36 to the right-hand end of the double-acting "right-left" cylinder 18 for a "left" phase. Ball check 41 maintains cylinder 18 thus pressurized to any desired degree to the left during a "hold" condition determined by the time that the "left" pushbutton is depressed.

Similarly and conversely, when it is desired to operate the plunger 19 of cylinder 18 to the right (FIG. 9), the "right" pushbutton is depressed to simultaneously energize solenoid C and motor 14 to operate pump 12. This voids pressure fluid from the right-hand end of cylinder 18 through external line 36, ball check chamber 25 and valve passage 71 to the exhaust line 67 of solenoid valve 62, thence to the tank or sump 68. The valve seats for ball checks 40 and 41 are sealed by the lands 47, 48 of spool 46, so that pressure from manifold chamber 21 is now transmitted through external line 35 to the left-hand end of cylinder 18 for the cylinder "right" phase.

In both of the "left" and "right" positions of FIGS. 8 and 9, hydraulic operating pressure is locked in the single-acting "up-down" cylinder control lines 37 and 70 by the center ball check 40. Conversely, the ball checks 39, 41 lock hydraulic pressure in the lines 35, 36 of double-acting cylinder 18, and its solenoid valves, during the "up-down" phases.

While the valve 10 and system 15 are described above as hydraulic in nature, it is of course evident that the principles of the invention are also suitable to pneumatic pressure application and control. Likewise, while "right-left" cylinder 18 has been shown and described as a conventional double-acting one, it might equally be two single-acting cylinder units connected to a common load.

What I claim is:

1. A fluid pressure control valve mechanism, comprising a spool-type valve unit having an intake pressure port and at least three output pressure ports, said valve unit having internal pressure flow passage means and a slidable valve spool controlling flow of pressure fluid through said passage means from said intake port to an output pressure port or ports, a valve device operatively connected in communication with each of said output ports to permit a reverse flow of pressure liquid in the latter, means blocking such reverse flow against return to said valve units, and means selectively operating said valve devices to control said reverse flow.

2. The valve mechanism of claim 1, in which said valve unit has internal pilot passage means normally subject to fluid pressure at said intake port, pressure in said pilot passage means being effective on said valve spool to control the position thereof and the flow of pressure fluid in said internal pressure flow passage means to said output pressure ports.

3. The valve mechanism of claim 2, in which said valve devices are normally closed ones opening in response to the operating means therefor to discharge said reverse flow.

4. The valve mechanism of claim 2, in which said pilot pressure passage means includes restricted orifices subjecting opposite ends of said valve spool to the pressure of said intake port.

5. The valve mechanism of claim 1, in which said valve unit has internal pilot passage means normally subject to fluid pressure at said intake port, pressure in said pilot passage means being effective on said valve spool to control the position thereof and the flow of pressure fluid in said internal pressure flow passage means to said output pressure ports, and spring means acting on said valve spool to locate the latter in a position in which pressure is applied from said intake port through said pressure flow passage means to only one of said output ports.

6. The valve mechanism of claim 5, in which said valve devices are normally closed ones opening in response to the operating means therefor to discharge said reverse flow.

7. The valve mechanism of claim 6, in which said pilot pressure passage means includes restricted orifices subjecting opposite ends of said valve spool to the pressure of said intake port.

8. The valve mechanism of claim 5, in which said pilot pressure passage means includes restricted orifices subjecting opposite ends of said valve spool to the pressure of said intake port.

9. The valve mechanism of claim 1, in which said valve devices are normally closed ones opening in response to the operating means therefor to discharge said reverse flow.

10. The valve mechanism of claim 1, in which said valve devices are electrically operated solenoid valves opening upon electrical energization to discharge the reverse flow.

11. The valve mechanism of claim 1, in which said valve devices are mounted on a body member of said unit in which said passage means is formed.